Oct. 4, 1966    L. F. BLATT    3,276,763
OIL CUSHION CYLINDER FOR ABSORBING SHOCK LOADS
Filed Jan. 4, 1965

INVENTOR
LELAND F. BLATT

BY  Cullen Sloman & Cantor
ATTORNEYS

United States Patent Office 3,276,763
Patented Oct. 4, 1966

3,276,763
OIL CUSHION CYLINDER FOR ABSORBING
SHOCK LOADS
Leland F. Blatt, 24121 Maud Road, Grosse Pointe, Mich.
Filed Jan. 4, 1965, Ser. No. 422,929
3 Claims. (Cl. 267—1)

The present invention relates to an oil cushion bumper and more particularly to an oil cushion cylinder for absorbing shock loads.

It is an object of the present invention to provide a simplified oil cushion bumper which incorporates a cylinder, piston and rod assembly, a floating piston on the rod defining a pair of sealed control chambers and resilient means for effecting return movement of the parts upon release of a shock load intermittently applied to the bumper.

It is another object to provide a novel sealing means of the cylinder assembly.

These and other objects will be seen from the following specification and claims in conjunction with the appended drawing in which:

It will be understood that the above drawing illustrates merely a preferred embodiment of the invention, and that other embodiments are contemplated within the scope of the claims hereafter set forth.

Figure 1:
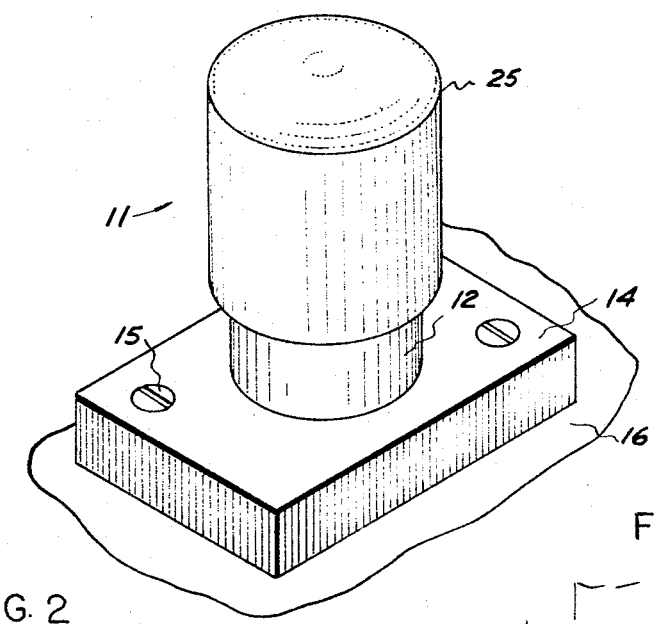
FIG. 1 is a perspective view of the present oil cushion bumper.

Referring to the drawing, the present oil cushion bumper for absorbing shock loads, generally indicated at 11, FIG. 1, includes a barrel or cylindrical body 12 which at one end extends and is sealed within circular aperture 13 in base 14 anchored at 15 upon support 16.

Figure 2:
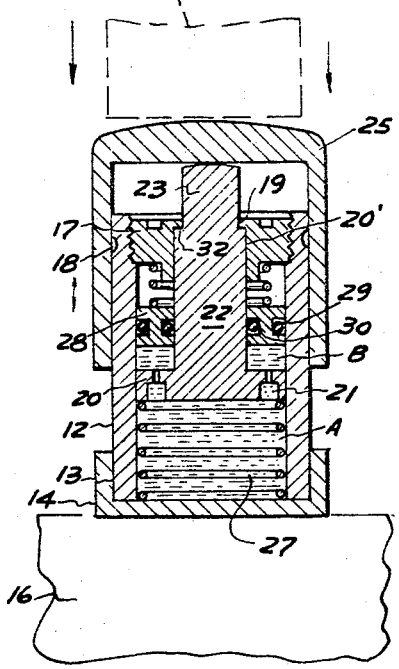
FIG. 2 is a longitudinal section thereof with the parts in rest position.

The upper open end of barrel 12 is interiorily threaded and receives cap 17 which is staked in position as at 18, FIG. 2. Said cap has a bore 19 and a counterbore 20' defining stop shoulder 32 registerable with piston rod 22. One end of said rod is axially joined to reciprocal piston 20 movably nested within and engaging barrel 12.

A series of orifices 21, which may be regulated in size, are provided through piston 20 to permit the passage of liquids such as oil between chambers A and B upon opposite sides of said piston.

Rod 22 towards its upper end has an extension 23 of reduced diameter defining the shoulder 24 which is movable within counterbore 20' and adapted in rest position to engage stop 32, FIG. 2. Stop 24 limits upward movement of rod 22 with respect to said cap.

Cup-shaped cover 25 is inverted over the upper end of barrel 12 and slidably mounted thereon; and in the inoperative or rest position shown, FIG. 2, bears against extension 23 of rod 22. The cover 25 is adapted to receive intermittent axial shock loads thereon as designated schematically at 26.

Coil spring 27 is positioned within barrel 12 and is interposed between base 14 and reciprocal piston 20 normally biasing the piston to rest position, FIG. 2. The floating piston 28 is normally spaced from piston 20 and is movably mounted upon rod 22 and relative to the bore of barrel 12.

Said floating piston has a pair of concentric annular recesses in its inner and outer surfaces within which are nested the concentric O-ring seals 29 and 30 which respectively engage surface portions of said barrel and rod 22 for defining a seal therebetween and for sealing off chamber B within the cylinder assembly.

Coil spring 31 extends around rod 22 and is interposed between cap 17 and floating piston 28 normally biasing piston 28 towards piston 20.

Piston 20 has several orifices 21 for allowing liquid to flow between chambers A and B upon opposite sides of said piston. The orifice diameters are adjustable depending upon the nature of the shock load involved and the characteristics of shock absorption and piston stroke desired.

Operation

Figure 3:
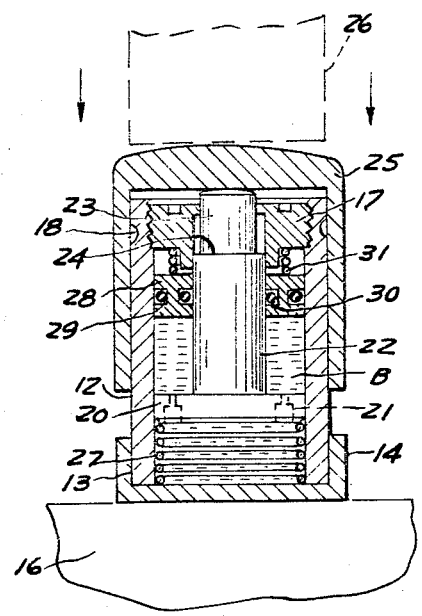
FIG. 3 is a similar view with the parts shown in activated position.

Cover 25 has a sliding fit upon barrel 12, and upon application of shock load 26 axially thereof causes an axial inward movement of rod 22 against which it rests. The shock force transmitted through cover 25 and said rod to piston 20 is initially resisted yieldably by spring 27. The liquid, such as oil, in chamber A now under pressure begins to flow through orifices 21 and begins to fill chamber B, FIG. 3. Piston 20 will stop its longitudinal movement when the cover 25 engages the top of body 12 to thus define a specified piston stroke. At the same time as liquid is entering chamber B floating piston 28, sealed as at 29 and 30, is moving upwardly from the position shown in FIG. 2 to the position shown in FIG. 3, compressing spring 31.

When shock load 26 is removed from cover 25, spring 27 forces piston 20 upwardly towards rest position, FIG. 2, with liquid flowing from chamber B to chamber A. At the same time compressed spring 31, FIG. 3, forces floating piston 28 to return from the position in FIG. 3 back to the position in FIG. 2 assisting in the forcing of liquid from chamber B back to chamber A until the assembly is ready for the next cycle.

By this construction no heavy pressure loads are applied to the floating piston seals 29 and 30 since spring 31 controls the fluid pressure. Thus, the seals have a long life and there will be substantially no fluid leaks.

Having described my invention reference should be had to the following claims.

I claim:

1. An oil cushion bumper for absorbing shock loads comprising:
   a cylindrical barrel mounted upon a support, closed at one end;
   a cap closing its other end and having a bore and a counterbore defining a stop;
   a first piston with orifices therethrough movable within and engaging the barrel;
   a rod on said piston including at its free end an extension of reduced diameter movably positioned through said bore, extending outwardly of said cap and defining a shoulder movable in said counterbore and engagable with said stop;
   a cup-shaped cover axially mounted over and slidably engaging said barrel normally bearing against said rod extension and adapted to receive intermittent axial shock loads;
   a floating piston spaced from said first piston movably mounted on said rod and engaging said barrel;
   said pistons defining a pair of chambers upon opposite sides of said first piston and containing a liquid;
   sealing means on said floating piston in engaging registry respectively with said rod and said barrel;
   and spring means in said barrel anchored adjacent its opposite ends and bearing against said pistons respectively normally biasing said pistons towards each other.

2. In the oil cushion bumper of claim 1, said sealing means consisting of a pair of concentric O-ring seals nested and retained within said floating piston.

3. In the oil cushion bumper of claim 1, said spring means including a pair of springs:
   a shock load applied to said first piston being normally resisted by one spring which is compressed on reactive movement of said first piston as fluid from one chamber passes through said orifices to the other chamber;

the increase of liquid volume in said other chamber moving said floating piston compressing the other spring;

said pistons, on release of said shock load being biased towards each other facilitating return of said pistons to their initial rest position and said liquid from said other chamber back to said one chamber.

No references cited.

ARTHUR L. LA POINT, *Primary Examiner.*

R. M. WOHLFARTH, *Assistant Examiner.*